INVENTOR.
WILLIAM G. SWARNER
CLINTON E. PRETTYMAN
BY
*ATTORNEY*

Jan. 23, 1973 W. G. SWARNER ET AL 3,712,985
OPTICAL SPATIAL FILTER FOR MODIFICATION
OF RECEIVED ENERGY VS RANGE
Filed Sept. 17, 1970 2 Sheets-Sheet 2

INVENTOR.
WILLIAM G. SWARNER
CLINTON E. PRETTYMAN
BY
ATTORNEY

United States Patent Office
3,712,985
Patented Jan. 23, 1973

3,712,985
OPTICAL SPATIAL FILTER FOR MODIFICATION
OF RECEIVED ENERGY VS RANGE
William G. Swarner and Clinton E. Prettyman, Columbus, Ohio, assignors to the United States of America as represented by the Secretary of the Navy
Filed Sept. 17, 1970, Ser. No. 72,908
Int. Cl. G01c 3/08
U.S. Cl. 250—216        7 Claims

ABSTRACT OF THE DISCLOSURE

In an optical ranging system for locting targets beyond an uneven interface comprising a pulsed laser transmitter aligned with an optical receiver, the return from close targets is reduced by including a spatial filter having a dense central portion at the focal plane of an objective lens in the receiver thereby reducing dynamic range and preventing receiving saturation from volumetric backscatter near the interface.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention pertains generally to the field of optical ranging, and more particularly to improvements in optical receivers used in airborne optical ranging systems for detecting subsurface targets.

There is an increasing demand for a system similar to radar and sonor which will permit direct detection of underwater objects such as submarines from the air. Because the radio frequency signals normally used in radar are unsuitable for underwater use, airborne ranging systems for detecting subsurface targets at sea have employed optical techniques. The attenuation of light by sea water varies greatly with wave length. There is, however, a band of wave lengths for which attenuation is greatly reduced. At least one of the wave lengths within this band is available currently from powerful laser sources. Thus it has been found possible to transmit a form of electromagnetic radiation through sea water within acceptable limits of energy loss.

In the past all air-to-water optical ranging systems have experienced severe signal degradation due both to the effects of the air-water interface and underwater attenuation of the optical signals by absorption and scattering. When an optical transmitter and receiver are aligned above the water, the largest return from a beam of light projected substantially perpendicularly to the air-water interface will be from the sea surface. Another strong return will be from atmospheric backscatter due to dust particles. Nontarget reflections are also produced by particulate matter near the ocean surface. This latter type of return is generically termed "volumetric backscatter" and is caused by solid particles, debris, living organisms, water molecules, dissolved gases and other materials. Volumetric backscatter is considerably greater near the surface. The received signal strength of light reflected from a target object well below the surface has been found to be far lower than the other returns mentioned. Accordingly, when the sensitivity of an optical receiver is optimized for a deep target object, the receiver will be saturated by the intense nontarget signals. In particular, the high energy of shallow object reflections, such as those produced by volumetric backscatter, cause an unacceptable variation in the return; that is, a high dynamic range is experienced.

SUMMARY OF THE INVENTION

Accordingly, one of the objects of the invention is to avoid optical receiver saturation due to nontarget returns from the region at and adjacent to an uneven boundary between two media. Another object of the invention is to improve the signal-to-noise ratio in an optical receiver used for air-to-water optical ranging. A further object of the invention is to optically distinguish subsurface targets at varying depths and to reduce the dynamic range of target returns.

These and other objects of the invention are achieved by providing an optical ranging system for airborne detection of underwater targets comprising a laser transmitter for projecting light through the air-water interface aligned with an optical receiver having a spatial filter with a dense central portion located in the focal plane of an objective lens for blocking a central portion of the image of the interface thereby preventing receiver saturation due to surface reflections and reflections from subsurface sources located near the interface.

DESCRIPTION OF THE PREFERRED EMBODIMENTS

Figure 1:
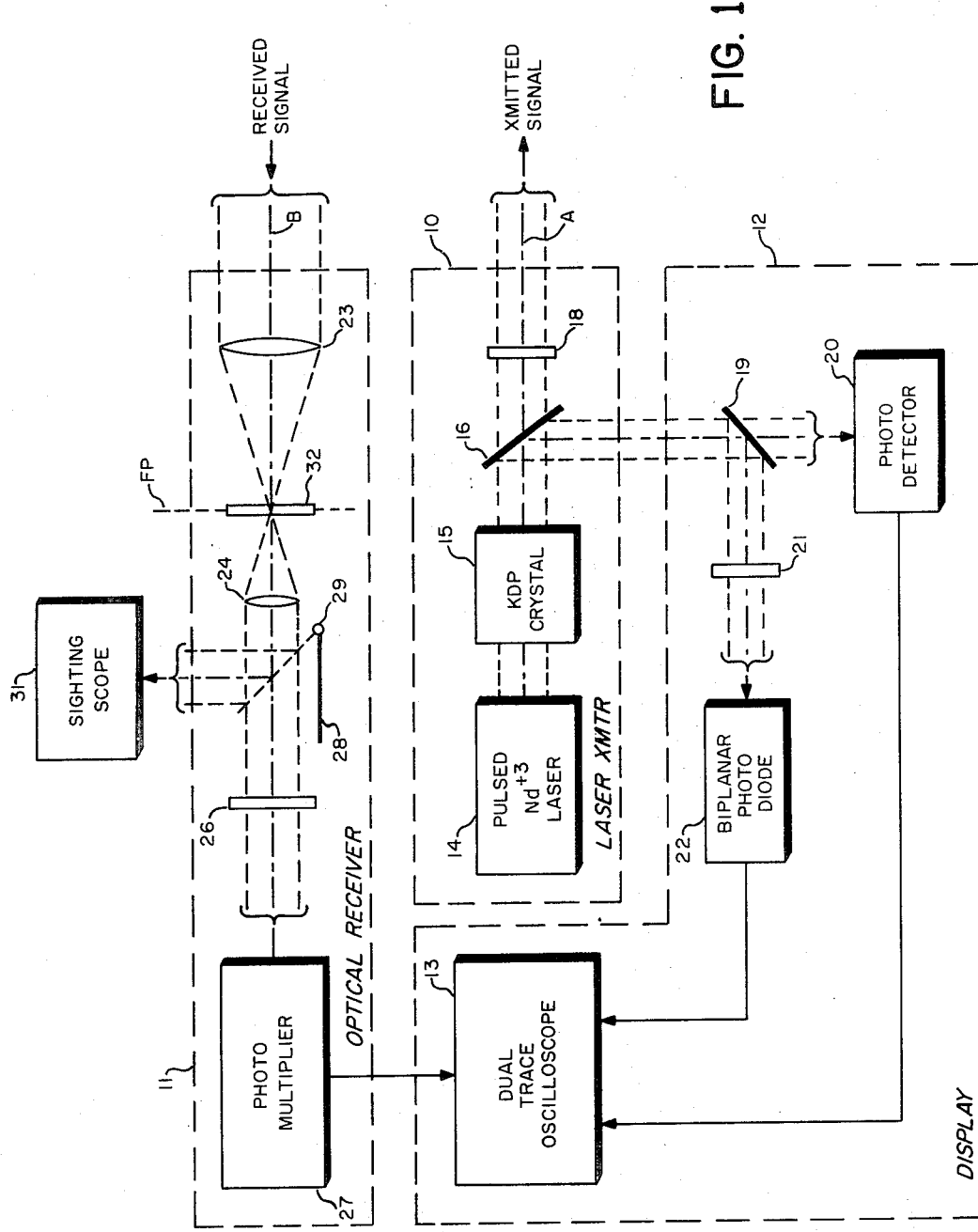
FIG. 1 is a block and schematic digram of an optical ranging system according to the invention.

The optical ranging system in FIG. 1 comprises a laser transmitter 10 which produces short pulses of coherent collimated light and an optical receiver 11 for detecting a reflected portion of the light produced by transmitter 10. A display 12 having a dual trace oscilloscope 13 or other suitable means may be used for indicating the interval between transmission and receipt of the optical signal. One trace is used for the received signal while the other trace is used to monitor the transmitted or reference pulse.

Transmitter 10 comprises a pulsed $ND^{+3}$ laser 14. Neodymium lasers are conventional, commercially available devices, the detailed construction of which forms no part of the invention. A typical neodymium laser comprises an electrical discharge flash lamp having an elliptical reflector adjacent to a rod of neodymium doped silicate glass or ytterum-aluminum-garnet (YAG) disposed in a resonating cavity bound at one end by a semireflective optical flat and at the other end by, for example, a rotating prism Q-switch at a distance precisely equal to a whole number of half wave lengths of the emitted light. A timing unit activates the flash lamp immediately before the prism closes the resonating cavity. The rotating prism may be replaced by an electro-optical device known as the Pockel cell which causes the polarized laser light to be reflected when activated. The output of pulsed laser 14 is a collimated coherent beam of pink, infrared light which is passed through a potassium dyhydrogen phosphate (KDP) crystal 15 which doubles the frequency or halves the wave length to produce the second harmonic, converting the infrared beam to the desired green beam of coherent collimated light. One half of the neodymium wavelength was chosen due to the greatly reduced attenuation of green light in sea water. Furthermore, pulsed neodymium lasers are capable of the high peak power necessary for optical ranging at extended depths.

The output of crystal 15 as shown in FIG. 1 passes through a semireflective flat mirror or beam splitter 16 oriented at a 45° angle to the optical axis A of the collimated light beam. The major portion of the light beam is transmitted through mirror 16 and passed through a $CuSO_4$ filter 18 to absorb the unneeded infrared. The resulting transmitted signal is a monochromatic narrow coherent beam of green light. The pulse width may be on the order of 25 nanoseconds and typical pulse repetition rates would be between 1 and 50 per minute depending on the type of target to be detected. The minor portion of the laser beam is reflected perpendicularly to axis A by mirror 16 and passes through a second semireflective mirror 19 positioned at a 45° angle to the axis of the reflected light path from mirror 16 to a photo-detector 20 whose electrical output indicative of the leading edge of the transmitted laser pulse is connected to the sweep generator trigger input for dual trace oscilloscope 13. For both traces the horizontal sweep is initiated by the output of detector 20. The portion of the light reflected by semireflective mirror 19 is passed through a $CuSO_4$ filter 21 similar to filter 18 in transmitter 10 for excluding infrared. The filtered beam impinges on a biplanar photodiode 22 the output which is a more sensitive reproduction of the waveform of the laser light pulse. The output of diode 22 is connected to the vertical deflection input for one of the oscilloscope traces to provide a display of the reference pulse for monitoring the performance of laser 14.

Optical receiver 11 comprises an objective or focusing lens 23 for forming an image in a focal plane FP behind which is a recollimating lens 24 centered on optical axis B. The recollimated light output from lens 24 passes through a spectral filter 26 having a narrow bandpass centered on the wavelength of the transmitted signal to exclude ambient light. The output of filter 26 is incident on a photomultiplier 27 having a conventional photocathode aligned with the optical axis B. The electrical output of photomultiplier 27 indicative of the strength of the filtered received signals is connected to the vertical deflection input of the second trace on oscilloscope 13 thereby providing an A-type radar display wherein the horizontal displacement of a received pulse is related to the target range. A beam splitter 28 pivoted at point 29 may be swung into 45° orientation with axis B to reflect a portion of the received light to a sighting telescope 31 for aiming receiver 11 at a desired area.

Figure 2:
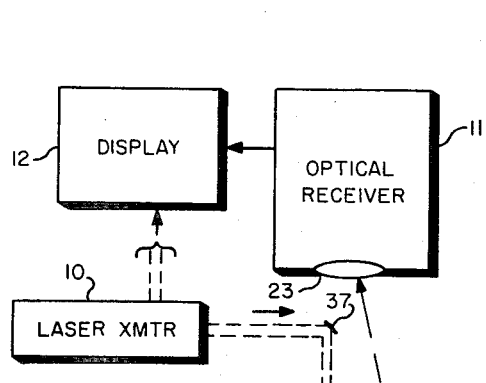
FIG. 2 is a plan view of one embodiment of the optical spatial filter in the receiver of FIG. 1.
Figure 2:
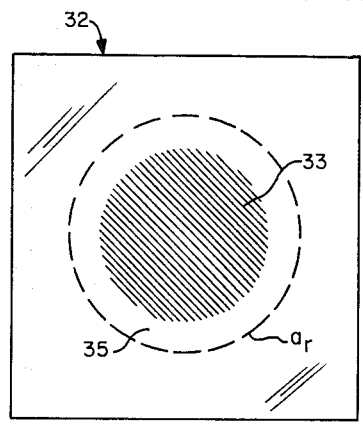

An optical spatial filter 32 perpendicular to optical axis B is included at focal plane FP for blocking a central portion of the received light. Referring now to FIG. 2, filter 32 according to the invention may comprise a slide or film of transparent material such as glass having a uniformly dense semiopaque central portion 33 of reduced transmittance which may be a darkened or obscured area on a glass slide. Dashed circular reference line $a_r$, not physically a part of filter 32, represents the perimeter of the image formed by lens 23 corresponding to the area subtended by the angular field of view. Received light may thus pass unattenuated only through the annular ring 35 between darkened area 33 and line $a_r$. As will become apparent, the area enclosed by line $a_r$ corresponds to area $A_R$ in FIG. 4.

Figure 3:
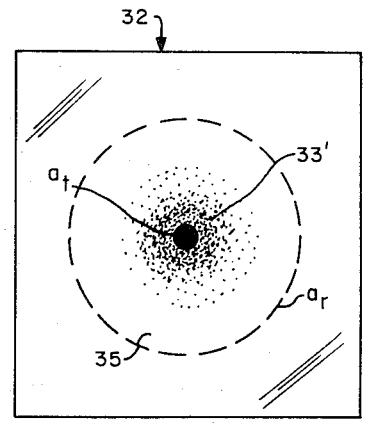
FIG. 3 is a plan view of another embodiment of the spatial filter of FIG. 1.

Another embodiment of filter 32 shown in FIG. 3 replaces the uniform semiopaque area 33 of FIG. 2 with an annular disc area 33' of increasing optical density toward the center. A smaller circular opaque area $a_t$ is centered on optical axis B (FIG. 1) and, as will be shown, corresponds with area $A_T$ in FIG. 4. As in FIG. 2, light passes unattenuated only in annular region 35.

Figure 4:
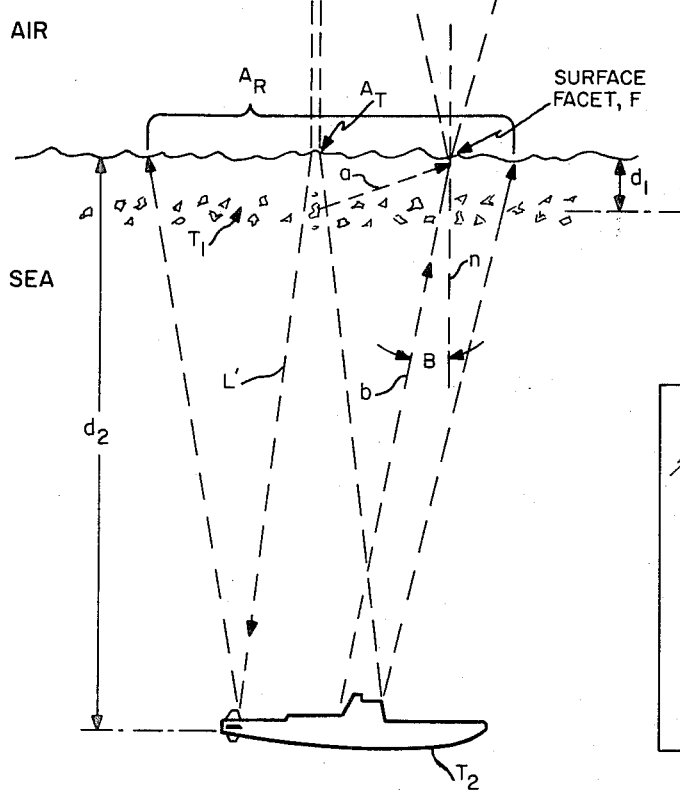
FIG. 4 is a diagram illustrating the geometrical relationship between typical light paths produced by the optical ranging system of FIG. 1.

The operation of the ranging system with spatial filter 32 can be more readily understood by reference to FIG. 4. Airborne laser transmitter 10 projects a beam L of collimated coherent green light via a one-way 45° reflective mirror 37 onto the sea surface illuminating the circular area $A_T$ thereon. Mirror 37 is included only to indicate that the optical axis of the transmitted beam L is to be aligned with the optical receiving axis of receiver 11 so that the image of the area $A_T$ will be centered on the optical axis of objective lens 23. Most of transmitted beam L passes through the surface area $A_T$ after refraction, in accordance with the reflective index of sea water, by the various surface facets or incremental areas which make up the normal sea surface. The effect of refraction combined with the different surface slopes within $A_T$ cause the collimated beam to spread, the time-averaged result of which is a somewhat broader beam L' propagating through the water. Some of the light energy will be reflected directly back by area $A_T$ and picked up by receiver 11. The surface-reflected rays must, of course, come from area $A_T$ since no other area on the surface is illuminated by transmitter 10. Therefore, if the receiver objective 23 is focused on the sea surface, all such rays will pass through the image of area $A_T$ in the receiver focal plane FP (FIG. 1) and can thus be removed by means of a suitable spatial filter. Opaque spot $a_t$ in FIG. 3 serves this function. Thus the size of spot $a_t$ should be exactly equal to the image size of area $A_T$. Alternatively a small mirror might be used to reflect these surface-reflected rays to another photodetector for altitude determination or other use if desired. The area on the sea surface, $A_R$, representing both the field of view of receiver 11 and typical reflected energy from a submerged target, is much larger than area $A_T$. Accordingly, blanking the small area $A_T$ in the focal plane FP will not significantly reduce the energy received from a subsurface target.

At depth $d_1$ below the sea surface, plural targets $T_1$ consisting of particulate matter and shallow photoactive organisms such as plankton are located. A target submarine $T_2$ is at a much greater depth $d_2$. It is assumed that some light from beam L' will be reflected by shallow targets $T_1$ as well as by the deeper target $T_2$. It should be understood that for this discussion targets $T_1$ and $T_2$ are not limited to any particular kind of reflective body. For instance, target $T_2$ could be the sea bottom in the case of an optical depth sounder. Some of the reflected energy from targets $T_1$ and $T_2$ will be collected by receiver 11. The light entering receiver 11 originating from the deeper target $T_2$ will be much weaker than that received from target $T_1$ perhaps by 50 db or more, if $T_1$ and $T_2$ represent targets of equal reflectivity, because of the severe attenuation by the water and beam spread of the transmitted and reflected energy.

If any target-reflected ray such as from a $T_1$ is to contribute to the received signal at lens 23 then the pertinent geometrical considerations dictate that the surface facet F where the ray intersects the surface must have the proper slope, within the limits determined by the receiver aperture and altitude, such that the ray will be refracted into the receiver aperture as shown for ray $x$. If the slope of facet F is incorrect, the exiting ray will miss the receiver as illustrated by ray $y$. The statistical probability that the slope of any particular facet will lie within the allowable range at a given time can be determined from the sea surface slope probability distribution. The total average received signal from a submerged target such as $T_1$ is given by the summation, over all target-reflected rays reaching the sea surface within the receiver field of view $A_R$, of the energy contained in the ray times the probability that the corresponding surface facet will have the proper slope to refract the ray into the receiver.

Consider now a typical reflected ray such as $b$ from the deeper target, $T_2$ which also intersects the surface at facet F. If ray $b$ is to contribute to the received signal, the facet slope must be such that this ray will also be refracted into the receiver. However, because of the smaller incident angle $\beta$ relative to average sea surface normal $n$, the facet slope required to refract ray $b$ into the receiver will be smaller than that required for ray $a$. In general, it can be shown that the smaller surface facet slopes have a higher probability of occurrence. Indeed, it appears that the highest theoretical probability assigned to any single slope is for the horizontal or zero value relative to average sea level. From 0° up to 90° or normal slopes, the probability distribution assumes a shape similar in appearance to one symmetrical half of the familiar gaussian bell-shaped curve. As a result, ray $b$ is more likely to be refracted into the receiver than ray $a$. Consequently, most of the reflected energy from a shallow target such as $T_1$ is received from the area on the sea surface near the axis of the incident transmitted beam, adjacent to and including area $A_T$, while a correspondingly greater percentage of energy from a deeper target such as $T_2$ is received from areas farther off-axis.

This phenomenon due to the statistical characteristics of the ocean surface may be utilized to more nearly equalize the strength of the returns from shallow and deep targets. If one disregards or blocks out a concentric circular area in the image having a radius approximately one-half that of the subtended area $A_R$, the conclusion can safely be drawn that any return obtained from the remaining unblocked annular area is probably from a deep target rather than a shallow one.

A spatial filter, such as those depicted in FIGS. 2 and 3, may be used to obscure the central portion of the image of the surface. In FIG. 2, the semiopaque disc 33 is designed to block a selected percentage of the near off-axis reflected energy thereby in effect emphasizing the farther off-axis region defined by annular area 35. The neutral density of area 33 may be varied in accordance with the attenuation constant of the sea water, degree of volumetric back-scatter encountered, depth of expected target objects and other suitable parameters. A typical opacity for area 33 is N.D.=3.5. The size of area 33 is strictly less than the area enclosed by $a_r$ corresponding to the field of view subtending area $A_R$ in FIG. 4, and greater than the area corresponding to $A_T$ illuminated by beam L. Within these limits, the dynamic range of the receiver will be reduced; however, those skilled in the art will recognize that for a given situation the size may be optimized to yield acceptable signal strength from desired targets as well as reduced dynamic range.

The filter of FIG. 3 illustrates a preferred embodiment wherein surface reflections which account for a major portion of the reflected energy are completely blocked by the precisely defined opaque spot $a_t$ in the middle of the filter 32. The area of the opaque spot is exactly equal to the area of the image of the illuminated area $A_T$ on the sea surface. The varying density semiopaque annular disc 33' surrounding opaque spot $a_t$ is designed to block a selected percentage in varying degree of the near off-axis reflected energy. Area 33' has highest optical density toward the center, adjacent to $a_t$. The density is gradually reduced or tapered outwardly toward the transparent ring 35. The effect is to block increasingly greater portions of energy closer to the optical axis. The density distribution in area 33' closely resembles the reflected energy distribution from a shallow target caused by the increasingly lower probability of proper surface facet slopes farther off-axis.

In general then a spatial filter, with decreasing density from center to image edge, may be used in the receiver focal plane FP (FIG. 1) to selectively reduce the signals received from shallower targets so that the resulting target signals reaching the photomultiplier are as to strength relatively independent of target depth. Without such a spatial filter reflected energy varies too greatly with depth. Typically, over a dynamic range of about 50 db, the addition of a filter of the type depicted in FIG. 2 allows this dynamic range to be reduced to a 7–10 db range. An even further reduction will be experienced with the filter of FIG. 3. The filter thus has the effect of normalizing the return for various depths. Consequently shallow targets such as common organic particulate matter will not cause saturation of a receiver whose sensitivity has been optimized for deep targets. The spatial filter according to the invention is not to be confused with prior art filters which discriminate solely between transverse displacements of distant light sources relative to the optical axis. Rather, the disclosed ranging system incorporating the spatial filter according to the invention has the unique capability of optically distinguishing returns from varying ranges or depths.

The invention is not restricted to cases where the transmitted beam is perpendicular to the boundary surface. It is applicable in varying degrees of effectiveness to non-normal orientations. Even at oblique angles volumetric backscatter will be concentrated near the optical axis and deep target reflections will be more evenly distributed. Because of its spatial construction, the filter is independent of the wavelengths employed. The spatial filter according to the invention is not limited to laser ranging systems for airborne detection of subsurface objects but finds application in any optical ranging, communications or other system involving optical transmission and receipt through a multifaceted boundary layer where the probability of low slope surface facets is relatively high.

The spatial filter according to the invention is an uncomplicated, lightweight, inexpensive optical device having no mechanical or electrical parts to wear out which greatly improves the performance of optical receivers used in ranging systems. It eliminates highly complex electronic receiver circuitry otherwise required to obtain equivalent dynamic range and freedom from saturation by sea surface return and volumetric backscatter.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. An improved optical system for directly determining the location of a target object across an interface surface in a first medium of a given refractive index from a remote position in a second medium of a different refractive index, said system comprising in combination:

a transmitter means in said second medium for projecting in a given line of direction a pulsed narrow beam of coherent collimated light upon and through a limited area of an interface surface between the first and a second medium of differing refractive indices;

a reflected light receiver means cooperating with said transmitter means and aligned therewith for receiving light reflected by a target object in the second medium;

said receiver means comprising reflected light focusing means forming, at a focal plane position, an image of a relatively larger portion of the interface surface including therein the limited area thereof upon which the collimated light pulse is projected;

said receiver means further comprising, at said focal plane position, an optical element having a first area surrounded by a second, more transparent area, said optical element and said areas positioned and arranged to continuously attenuate the intensity of all frequencies in the central area of said element where said limited area is imaged;

the receiver means and said optical element being aligned with respect to the transmitter means and the line of direction of the pulsed light beam such that a light pulse projected upon said interface surface, reflected from a target object in the first medium, and returned through the focusing means is reduced in intensity relative to reflected pulsed light returned through said focusing means from a more remote target object in said first medium to reduce variations in intensity of the image of said larger portion of the interface surface formed by the reflected pulses.

2. The improved system of claim 1 in which the first area of the optical element comprises a first completely opaque portion aligned and positioned to block that portion of a light pulse which is reflected from the interface surface.

3. The improved system of claim 2 in which the first area comprises a second portion aligned and positioned to significantly reduce the intensity of pulsed light reflected from a target object in the first medium in a first zone adjacent the interface surface while the second area of the element permits pulsed light reflected from a target object in the first medium in a second zone more remote from the interface surface to appear substantially undiminished in intensity in the image of said layer.

4. The improved system of claim 3 in which the first area of said optical element is relatively opaque as compared with the second area of the element which is transparent.

5. The improved system of claim 4 in which the second portion of the first area of said optical element varies smoothly in opacity from opaque adjacent the first portion to transparent adjacent the second area.

6. The improved system of claim 5 in which the transmitter means comprises a pulsed laser system and photosensitive means cooperating with said optical element and said focusing means for indicating the presence of reflected light from target objects in said first medium in the image of said portion of said interface surface.

7. The improved system of claim 6 in which said pulsed laser system comprises a pulsed $Nd^{+3}$ laser operatively aligned with crystal means for doubling the laser output frequency to produce the second harmonic thereof to form the transmitted pulse and said receiver means further includes narrow bandpass optical spectral filter means positioned between said optical element and said photosensitive means for providing an optical output having a bandwidth including the second harmonic of the laser output.

References Cited
UNITED STATES PATENTS

| | | | |
|---|---|---|---|
| 3,446,555 | 5/1969 | Kahn | 356—5 |
| 3,414,875 | 12/1968 | Driver et al. | 350—162 SF |
| 3,497,704 | 2/1970 | Holmes et al. | 350—162 SF |

OTHER REFERENCES

Kozma et al.: "Spatial Filtering for Detection of Signals Submerged in Noise," Applied Optics, vol. 4, pp. 387–392, April 1965.

Cutrona et al.: "Filtering Operations Using Coherent Optics," Proc. of the National Electronics Conference, vol. 15, pp. 262–275, 1959.

"Undersea Coherent Light," Electronics, vol. 36, No. 8, p. 830, Feb. 22, 1963.

RONALD L. WIBERT, Primary Examiner

E. S. BAUER, Assistant Examiner

U.S. Cl. X.R.

350—162 SF; 356—4